United States Patent [19]

Maruyama et al.

[11] Patent Number: 4,639,037

[45] Date of Patent: Jan. 27, 1987

[54] AUXILIARY SEAT ASSEMBLY FOR USE IN VEHICLES

[76] Inventors: Hidekazu Maruyama, 2-1-16 Shinmachi, Kokubunji-shi, Tokyo; Kazuo Fujimaki, 403 Imajuku Nishi-cho, Asahi-ku, Yokohama-shi, Kanagawa-ken, both of Japan

[21] Appl. No.: 610,713

[22] Filed: May 16, 1984

[30] Foreign Application Priority Data

Jun. 16, 1983 [JP] Japan ................................. 58-108058

[51] Int. Cl.⁴ ............................................... A47C 4/00
[52] U.S. Cl. ................... 297/334; 248/240.4
[58] Field of Search ............... 297/334, 332, 333, 331; 248/272.1, 240.4, 140, 142, 393

[56] References Cited

U.S. PATENT DOCUMENTS

| | | | |
|---|---|---|---|
| 1,509,863 | 9/1924 | Erickson | 297/334 X |
| 3,116,091 | 12/1963 | Bethoon et al. | 297/334 X |
| 3,480,324 | 11/1969 | Bauer et al. | 297/334 X |
| 3,600,033 | 8/1971 | Holdampf | 297/333 X |
| 3,873,153 | 3/1975 | Mackintosh | 297/334 |
| 4,052,102 | 10/1977 | Rosenthal | 297/334 |

FOREIGN PATENT DOCUMENTS

| | | | |
|---|---|---|---|
| 845573 | 6/1970 | Canada | 248/140 |
| 76810 | 5/1950 | Norway | 297/334 |
| 525989 | 9/1940 | United Kingdom | 248/393 |

Primary Examiner—Peter A. Aschenbrenner

[57] ABSTRACT

The auxiliary seat assembly for use in vehicles is improved which is foldably installed at the rear or lateral portion of the cab of an automobile. More specifically, the mechanism for pivoting the seat cushion is improved so that when the seat cushion is turned to the upright position, the upper surface thereof is directed frontward of the seat assembly.

6 Claims, 8 Drawing Figures

AUXILIARY SEAT ASSEMBLY FOR USE IN VEHICLES

BACKGROUND OF THE INVENTION

1. Field of the Invention

The present invention relates to an improved auxiliary seat assembly for use in vehicles, and more specifically to an auxiliary seat assembly which is used as installed at the lateral or rear portion of the cab of a vehicle such as truck or the like.

2. Description of the Prior Art

Generally, there is provided in the cab of a vehicle such as truck an auxiliary seat assembly (will be referred to as "the seat" hereinafter) and it is used as follows. For example in case two drivers ride in the cab of a truck on duty for a long-distance transport and they drive it in shifts day and night, one of them can take a nap or rest on the seat while the other is driving. Heretofore, various many seats of such kind have been proposed, one of which will be described as an example with reference to FIG. 1. The seats are so designed that while they are not used, the seat cushion 3 can be retained in upright posture for effective utilization of the space in the truck cab. The seat cushion 3 is pivotally mounted on a pair of brackets 7 installed on the floor 6 at the rear or lateral portion of the cab. When using the seat, the seat cushion 3 is swung out from the upright position and supported nearly horizontally by means of a pair of stays 9, so that one can seat himself on the seat cushion 3 with the body panel 8 used as a seat back.

As mentioned above, the seat cushion 3 is pivotally installed on the brackets 7 installed on the floor 6 at the lateral or rear portion of the cab, and it can be turned to upright position when not used. However, when the seat cushion 3 is turned to the upright position, the rear side thereof will be directed frontward and also the pivot mechanism and others under the seat cushion 3 are wholly visible, thus causing the cab interior to esthetically be degraded. Furthermore, the driver's body or his clothes may possibly be caught by any parts projecting from under the seat cushion 3, also causing a danger.

SUMMARY OF THE INVENTION

The present invention has a primary object to provide a seat for use in vehicles, which can be neatly folded.

The present invention has another object to provide a seat for use in vehicles, of which the mechanisms at the rear of the seat cushion will not be externally visible when the latter is folded, thus causing no danger in the cab of vehicles.

These and other objects and advantages of the present invention will be better understood from the ensuing description made by way of example of the embodiment of the inventive seat with reference to the drawings.

DETAILED DESCRIPTION OF THE PREFERRED EMBODIMENTS

Figure 1:
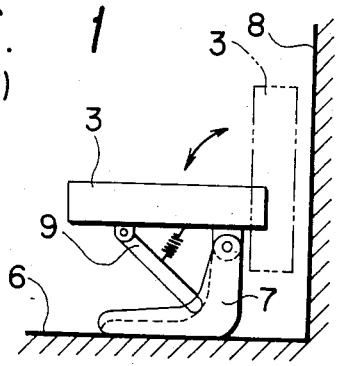
FIG. 1 is a sectional view of a conventional auxiliary seat assembly for use in vehicles.

FIGS. 2 to 5 show the first embodiment of the inventive seat which is suitably usable as an auxiliary seat in vehicles such as truck or the like. Generally speaking, in automobiles of this kind, the internal space of the cab is limited because the cab is isolated from the baggage room by a body panel 8. For effective use of the limited space of the cab, auxiliary seat on which the drive is to take a nap or rest, is disposed in the rear or lateral portion of the cab, and when the seat is not to be used, the seat cushion 10 can be turned to the upright position and retained there.

The seat is constructed as follows. It comprises a base 11 which is installed on a cab floor 6 of a vehicle as near to a body panel 8 as possible. Provided between the base 11 and a seat cushion 10 are first and second links 12 and 13 which provide for a pivot mechanism of the seat cushion 10. The first link 12 is provided for turning the seat cushion 10 in the direction of the upright position. It is pivotably secured at one end thereof by means of a pin 16 to a bracket 14 fixed to the rear surface of the seat cushion 10, the other end being fixed to a leaf spring 17 fixed to the base 11. On the other hand, the second link 13 has one end pivotally secured by means of a pin 19 to a bracket 18 fixed to the rear surface of the seat cusion 10, and the other end thereof is pivotally secured by means of a pin 20 to the top of the base 11, about which the seat cushion 10 is turned.

Figure 4:
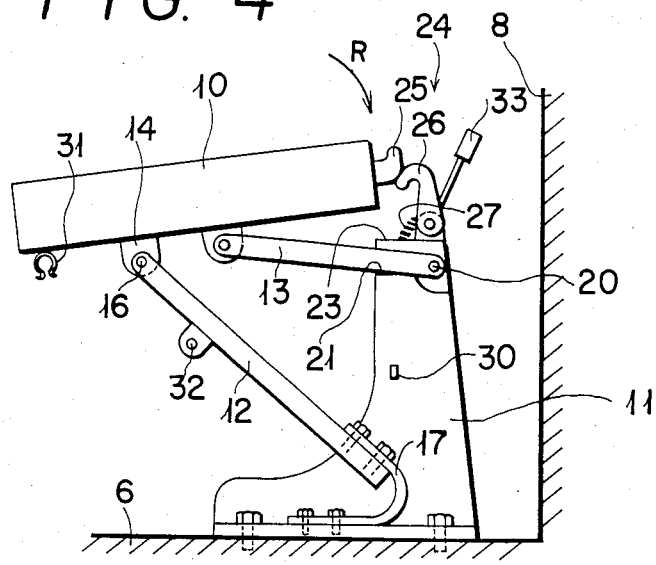
FIG. 4 is an explanatory illustration showing the inventive seat being unfolded to the used position.

Also a mechanism to retain the seat cushion 0 in horizontal and upright positions and a retaining mechanism of each link will be explained. First, there is provided a step-like stopper 21 formed at the upper portion of the base 11 to retain the second link 13 horizontally when the seat is used. This stopper 21 blocks the second link 13 from pivoting downward from the horizontal position when the seat cusion 10 is applied with the weight of any one or anything. The mechanism of retaining the seat cushion horizotally when using the seat consists of a stopper 23, the top of the base 11, which is to stop the rear end of the seat cushion 10 from falling, and a hook mechanism 24 which comprises an engaging piece 25 provided at the rear end of the seat cushion 10 and a hook 26 pivotally installed to a bracket 28 fixed to the top of the base 11. The hook 26 is so forced by a tension spring 27 as to pivot toward the seat cushion 10. The pivoting of this hook 26 is limited by a stopper 28a formed in the bracket 28 so that the hook 26 is retained in the upright position. Furthermore, the engaging piece 25 and hook 26 are so curved at their respective engaging portions as to easily be engaged with each other. Therefore, when the seat cushion 10 is turned in the direction of arrow R to a nearly horizontal position as shown in FIG. 4, the engaging piece 25 and hook 26 are automatically engaged with each other.

Figure 2:
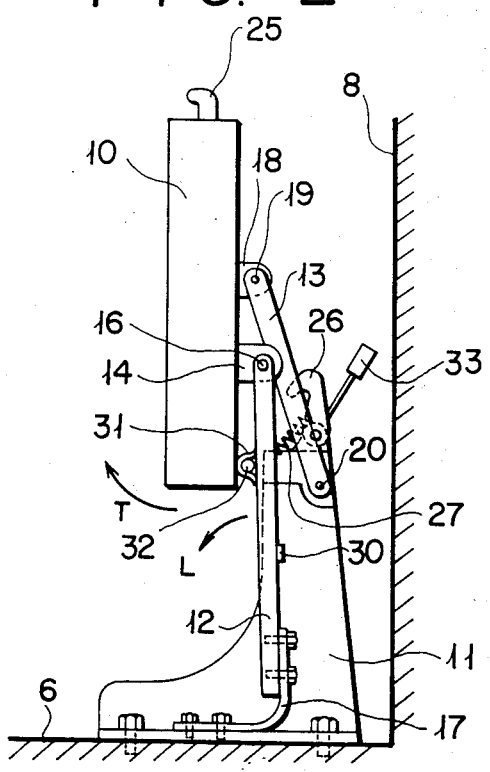
FIG. 2 is a sectional view of one embodiment of the inventive seat for use in vehicles.
Figure 3:
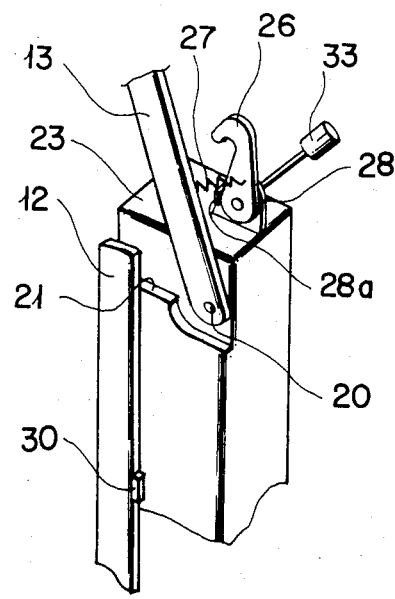
FIG. 3 is a perspective view of a part of the inventive seat shown in FIG. 2.

When the seat is not used, the first link 12 is retained in the upright position by means of a stopper 30 formed, as protruded, on the side face of the base 11. This stopper 30 is provided to block the first link 12 from being turned as forced by the leaf spring 17 from the upright position toward the body panel 8 when the seat cushion 10 has been turned to the upright postion. The mechanism to retain the seat cushion in the upright position consists of an engaging member 31 installed on the rear surface of the seat cushion near the front end thereof, and an engaging pin 32 installed by means of a bracket 32a at the intermediate portion of the first link 12. The engaging member 31 is made of a leaf spring which is cylindrically shaped so as to have a nearly same diameter as that of the engaging pin 32, and it has the circumference partially opened. When the seat cushion 10 is turned to the upright position, the engaging member 31 abuts against the engaging pin 32 which will be fitted into the engaging member 31, for thereby retaining the seat cushion 10 in the upright position as shown in FIG. 2.

The reference numeral 33 indicates a lever which has the hook 26 to pivot against the force of the tension spring 27; operating the lever 33 permits to disengage the hook 26 from the engaing piece 25 for making the seat cushion pivot.

The inventive seat is used as follows:

For raising the seat cushion 10 from the used position to the upright position, the lever 33 is turned in the direction of an arrow M to disengage the engaging piece 25 from the hook 26. The first and second links 12 and 13 will be turned as forced by the leaf spring 17 in the direction of the upright position and also the seat cushion 10 supported by the first and second links 12 and 13 be turned toward the upright position with the upper surface directed frontward. When the first link 12 is held in the upright position by the stopper 30, the engaging member 31 is engaged on the engaging pin 32. Thus the seat cushion 10 is retained in the upright position as shown in FIG. 2. The upper surface of the seat cushion 10 can be directed frontward, namely, toward the center of the cab, while the pivot mechanisms for the first and second links 12 and 13, and the other are positioned at the back of the seat cushion 10; thus the seat assembly will occupy only a small space in the cab. In other words, the free space in the cab will be large.

Figure 5:
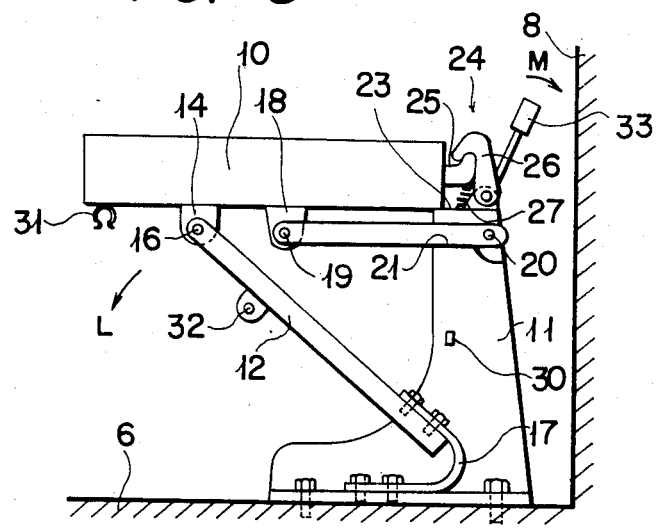
FIG. 5 is also an explanatory drawing of the inventive seat in the used position.

When using the seat (by changing the seat cushion's position from the upright position shown in FIG. 2 to the used position shown in FIG. 5), the seat cushion 10 is pulled at the lower end thereof frontward to disengage the engaging member 31 from the engaging pin 32, and it is further turned in the direction of an arrow T. The first and second links 12 and 13 will be turned in the direction of L against the force of the leaf spring 17. The seat cushion 10 will thus be positioned nearly horizontally as shown in FIG. 4. By turning the seat cushion 10 further in the direction of the arrow R, the engaging piece 25 at the rear end of the seat cushion 10 abuts against the hook 26. Thus, the hook forced by the engaging piece 25 is moved against the pulling force of the tension spring 27 while the engaging piece 25 is fitted inside the inwardly-curved portion of the hook 26. Thus, the engaging piece 25 is engaged with the hook 26, which is shown in FIG. 5. The rear end of the seat cushion 10 is secured due to the engagement between the engaging piece 25 and hook 26, while the second link 13 supporting the seat cushion 10 is prevented by the stopper 21 from being turned downward; therefore, the seat cushion 10 is held in the horizontal position (used position).

Figure 6:
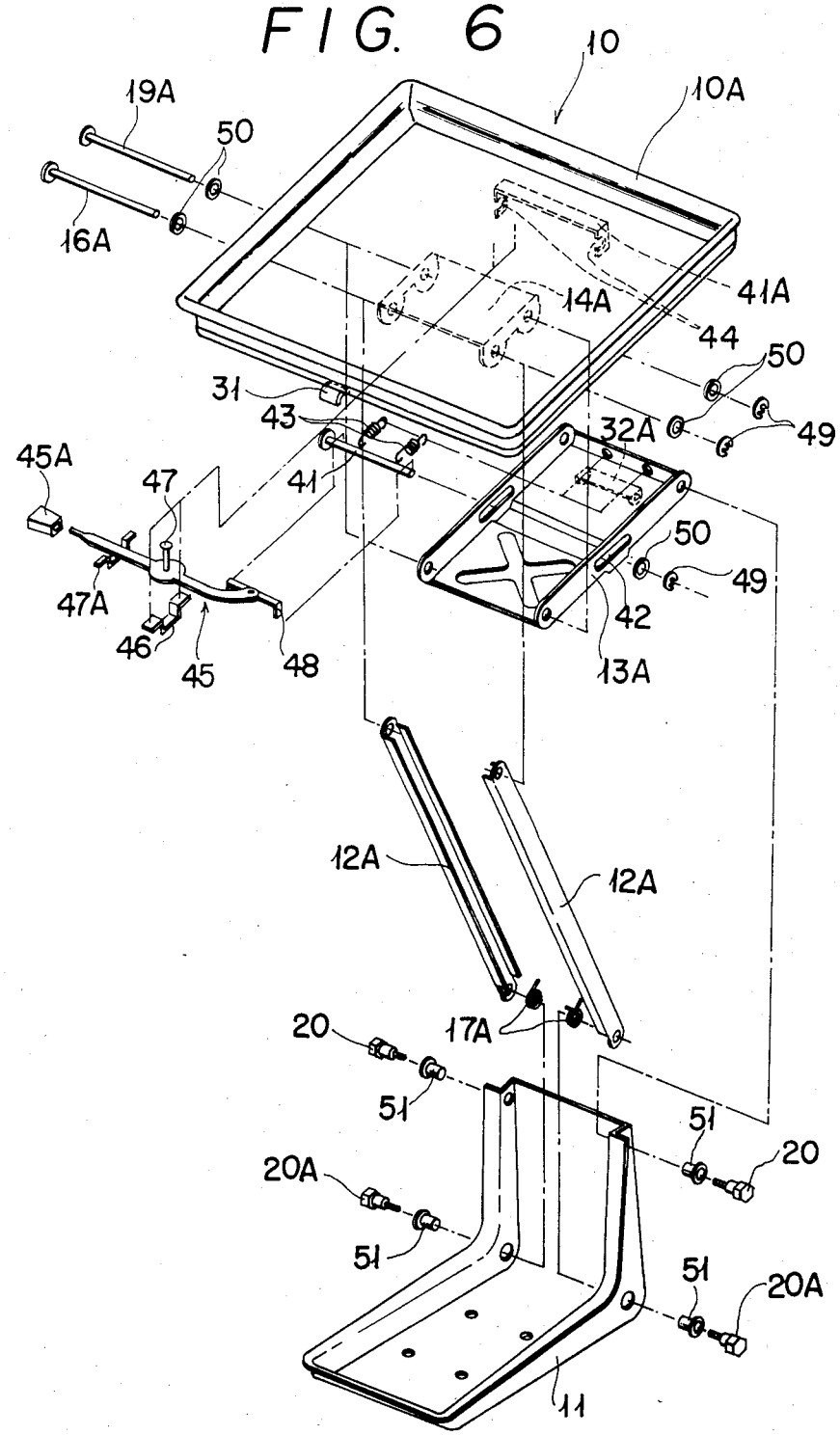
FIG. 6 is an exploded perspective view of another embodiment of the seat according to the present invention.
Figure 7:
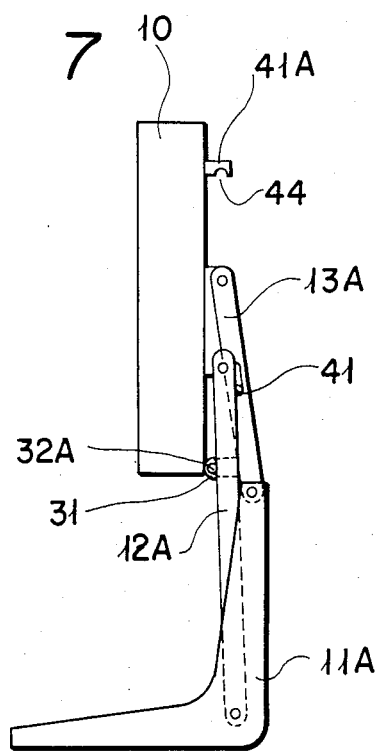
FIG. 7 is a side elevation view of the embodiment of FIG. 6 in upright position.

Next, the second embodiment of the inventive seat will be described below with reference to FIG. 6.

The second embodiment of the inventive seat has almost the same construction as the first embodiment, except that the seat cushion is moved under the action of an elastic member from the upright to horizontal or used position and that a locking mechanism is formed at the rear surface of the seat cushion. More specifically, there are provided first and second links 12A and 13A as a pivot mechanism between a traylike cushion frame 10A of which a seat cushion 10 is composed, and a base 11 having an L-shaped section. The first link 12A comprises a pair of links installed on the opposite sides, respectively, of the base 11. The first link 12A has one end fixed to a shaft 16A which is pivotably mounted on a bracket 14A fixed at the rear surface of the cushion frame 10A, and the other end pivotably mounted by means of a pin 20A to the lower portion of the base 11. Installed between the pin 20A and the first link 12A is an elastic member 17A such as coil spring which always forces the first link 12A so as to pivot upwardly. On the other hand, the second link 13A is composed of a flat plate provided at both the lateral sides with ribs formed by bending, and it has one end pivotally installed to a shaft 19A mounted on said bracket 14A parallelly to the shaft 16A, the other end being pivotally mounted at the upper portion of the base 11 by means of a pin 20.

Also a mechanism to keep the posture of the seat cushion 10, namely lock mechanism retaining the seat cushion horizontally is provided at the rear of the cushion frame 10A. The ribs of the second link 13A have formed therein elongated holes 42, respectively, through which a shaft-like lock pin 41 is so penetrated as to be positioned at the front surface side of the second link 13A. Provided between the lock pin 41 and second link 13A are tension springs 43 which position the lock pin 41 at the rear end of the elongated holes 42. At the rear side of the cushion frame 10A in a position corresponding to the lock pin 41, there is provided a stop bracket 41A which has formed at the front ends of the opposite sides thereof depressions 44 in which the lock pin 41 is to be engaged. When the lock pin 41 is engaged in the depressions 44, the second link 13A will be fixed. A lever 45 is pivotally installed at the rear side of the cushion frame 10A. The lever 45 has at the intermediate portion thereof a pin 47 which is fitted to a bracket 46 fixed to the rear surface of the cushion frame 10A, and it is pivotally supported between the cushion frame 10A and bracket 46. Also, the lever has mounted at one end thereof a knob 45A, and at the other end a latch 48 which is positioned inside the stop bracket 41A. When the lock pin 41 is engaged at the opposite ends thereof in the depressions 44 of the stop bracket 41A, the latch 48 is positioned behind the lock pin 41. By operating the lever 45 to move the latch 48, the lock pin 41 will be disengaged from the depressions 44 of the stop bracket 41A. Also a bracket 47A is provided to limit the pivoting range of the lever 45.

A mechanism to retain the cushion frame 10A in the upright position is installed to the front end of the cushion frame 10A, and it is composed of an engaging member 31 made of leaf spring by bending and an engaging pin 32A provided in a position where it will abut the engaging member 31 of the second link 13A when the cushion frame 10A is in the upright position. Further, there are provided an E ring 49, washer 50 and a collar 51.

Figure 8:
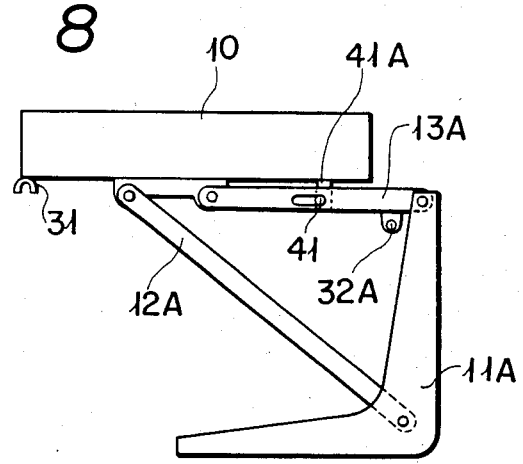
FIG. 8 is also a side elevation of the inventive seat of FIG. 6 in the used position.

This second embodiment of the inventive seat functions in a nearly same manner as the first embodiment having been described in the foregoing with reference to FIGS. 2 to 5, except for the following:

When using the seat (changing the seat position from the upright to horizontal (used) position), the seat cushion 10 is pulled at the bottom end thereof frontward to disengage the engaging member 31 from the engaging pin 32A. Thus, the second and first links 13A and 12A become pivotable, and the first link 12A is turned down under the action of the elastic member 17A. Along with the pivoting of the first link 12A, the seat cushion 10 is turned to the horizontal position, and the lock pin 41 of the second link 13A abuts against the stop bracket 41A and it is guided by the bottom edge of the bracket 41A into the depressions 44 thereof where it is engaged at the opposite ends; thus the second link 13A is secured to the seat cushion 10 which will be retained in the horizontal position (FIG. 8).

When the seat is not used (by changing the seat cushion position from the horizontal or used to upright position), the lever 45 is operated by the knob 45A to displace the latch 48. When the lock 41 is thus extracted from the depressions 44 of the stop bracket 41A, the seat cushion 10 becomes pivotable. By turning the seat cushion 10 upward to engage the engaging member 31 onto the engaging pin 32A again, the seat cushion 10 is fixed in the upright position.

The present invention is not limited to the aforementioned embodiments but can be embodied in many variations and modifications. In the embodiments having been described in the foregoing, a leaf spring is used as elastic member by way of example. However, the elastic member is not limited to a such leaf spring; a torsion bar may be used for the purpose. Also in the aforementioned embodiments of the present invention, the elastic member is interposed between the first link and base; however, it may be provided between the base and second link. Furthermore, it may be interposed both between the base and first link and between the base and second link.

As having been explained in the foregoing, the seat according to the present invention comprises a base installed on the floor of a cab at the rear or lateral portion thereof, a first link having one end pivotably installed at the lower portion of the base, the other end being pivotably installed on the rear side of a seat cushion, a second link having one end pivotably mounted at the upper portion of the base, the other end being pivotably installed as spaced from the first link, at the rear side of the seat cushion, in which when the seat cushion is turned to the upright position along with the pivoting of the first and second links, the front side of the seat cushion is ditected frontward. When the seat cushion is retained in the upright position, the upper surface of the seat cushion is directed frontward so that the links and the like at the back thereof are not visible, thus providing an esthetic improvement. Also, since the mechanisms such as links and others are not exposed outside, the user's body and clothes may not possibly be caught by them; therefore, the inventive seat is safely usable.

Furthermore, by providing such an arrangement that the seat cushion can be turned on or before the base, no space is required behind the base. So the base can be installed in a position as near the body panel of the cab as possible, for thereby permitting an effective utilization of the can interal space.

What is claimed is:

1. An auxiliary seat assembly for use in a vehicle, comprising:
   a base adapted to be securely fixed on a floor of the vehicle and having upper and lower portions,
   a seat to be pivotally connected to the base and having upper, lower, front and rear sides, said seat, in use, being moved into a horizontal position where the upper side of the seat faces upwardly and said seat, out of use, being located in an upright position where the upper side thereof faces forwardly,
   a first link member having a lower end pivotally connected to the lower portion of the base, and an upper end pivotally connected to the front lower side of the seat,
   a second link having a lower end pivotally connected to the upper portion of the base, and an upper end pivotally connected to the seat,
   means for preventing the second link from rotating downwardly beyond the horizontal position when the seat is in the horizontal position, said means being formed at the upper portion of the base,
   a spring member situated between the base and at least one of the first and second links to urge the seat to raise from the horizontal position to the upright position,
   an engaging piece disposed at the rear side of the seat,
   a hook situated at the upper portion of the base, said engaging piece engaging the hook when the seat is in the horizontal position to keep the seat in that position,
   an engaging member connected to the lower side of the seat, and
   means for detachably engaging said engaging member, said engaging means being situated on one of the first and second links, said engaging member engaging the engaging means when the seat is in the upright position to securely place the seat in that position.

2. An auxiliary seat assembly as set forth in claim 1, in which said spring member is a leaf spring provided between the base and the lower portion of the first link for urging the first link vertically.

3. An auxiliary seat assembly as set forth in claim 2, further comprising a tension spring provided between the hook and the base to urge the hook toward the seat, and a lever connected to the hook so that when the seat is in the horizontal position and the lever is operated, the hook is disengaged from the engaging piece to allow the seat to move to the upright position.

4. An auxiliary seat assembly for use in a vehicle, comprising:
   a base adapted to be securely fixed on a floor of the vehicle and having upper and lower portions,
   a seat to be pivotally connected to the base and having upper, lower, front and rear sides, said seat, in use, being moved into a horizontal position where the upper side of the seat faces upwardly and said seat, out of use, being located in an upright position where the upper side thereof faces forwardly,
   a first link having a lower end pivotally connected to the lower portion of the base, and an upper end pivotally connected to the front lower side of the seat,
   a second link having a lower end pivotally connected to the upper portion of the base and an upper end pivotally connected to the rear lower side of the seat, a spring member situated between the base and at least one of the first and second links to urge the seat to raise from the horizontal position to the upright position, a stop bracket connected to the rear lower side of the seat to extend downwardly therefrom and having at least one notch facing toward the front side of the seat, a lock pin situated perpendicularly to a longitudinal direction of the second link, said lock pin being connected to the second link to slide along the longitudinal edirection of the second link, at least one tension spring situated between the second link and the lock pin to urge the lock pin toward the lower end of the second link, and a lever connected to the lower side of the seat, said lever engaging the lock pin to move the lock pin toward the front side of the seat so that in case the lock pin engages the notch of the stop bracket to retain the seat in the horizontal positon, when the lever is actuated, the lock pin disengages from the notch of the stop bracket to allow the seat to rotate to the upright position.

5. An auxiliary seat assembly as set forth in claim 4, further comprising an engaging member connected to the lower side of the seat, and means for detachably engaging said engaging member provided on one of the first and second links, said engaging member engaging the engaging means when the seat is in the upright position to securely place the seat in that position.

6. An auxiliary seat assembly as set forth in claim 5, in which said spring member is a coil spring situated between the base and the first link, said coil spring urging the first link to move into the upright position.

* * * * *